US008421556B2

(12) United States Patent
Chen et al.

(10) Patent No.: US 8,421,556 B2
(45) Date of Patent: Apr. 16, 2013

(54) SWITCHED CAPACITOR ARRAY HAVING REDUCED PARASITICS (75) Inventors: Calvin (Shr-Lung) Chen, Irvine, CA (US); Ethan Chang, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 703 days.

(21) Appl. No.: 12/580,916

(22) Filed: Oct. 16, 2009

(65) Prior Publication Data

US 2011/0090024 A1 Apr. 21, 2011

(51) Int. Cl.
*H03H 7/00* (2006.01)
*H01G 4/00* (2006.01)

(52) U.S. Cl.
USPC ............................................ 333/174; 333/175

(58) Field of Classification Search ............... 333/174, 333/175
See application file for complete search history.

(56) References Cited

U.S. PATENT DOCUMENTS

| 7,439,570 | B2 * | 10/2008 | Anthony ..................... 257/309 |
| 7,728,676 | B2 * | 6/2010 | Nathawad et al. ............ 331/16 |
| 7,968,929 | B2 * | 6/2011 | Chinthakindi et al. ....... 257/307 |
| 8,143,692 | B2 * | 3/2012 | Jang et al. ................... 257/529 |
| 2003/0090277 | A1 * | 5/2003 | Lechner et al. .............. 324/686 |
| 2008/0203525 | A1 * | 8/2008 | Jang et al. ................... 257/529 |

* cited by examiner

*Primary Examiner* — Dean O Takaoka
*Assistant Examiner* — Alan Wong
(74) *Attorney, Agent, or Firm* — Sterne, Kessler, Goldstein & Fox P.L.L.C.

(57) ABSTRACT

A switched capacitor includes a capacitor and a switch. The capacitor is coupled between a p-node and an n-node and includes interleaved p-fingers and n-fingers. A number of the p-fingers is greater than a number of the n-fingers. The switch is coupled between the n-node and ground.

23 Claims, 7 Drawing Sheets

SWITCHED CAPACITOR ARRAY HAVING REDUCED PARASITICS

FIELD OF THE INVENTION

The present invention generally relates to a switched capacitor array having reduced parasitics. For example, the switched capacitor array can be used in conjunction with a frequency or bandwidth tuning device or circuit to increase a tuning range.

SUMMARY

An embodiment of the present invention provides a system comprising a device, an inductor, and a switched capacitor array. The device and the inductor are coupled between first and second nodes. The switched capacitor array is coupled to the first and second nodes and a ground node. Each switched capacitor in the switched capacitor array comprises a capacitor and a switch. The capacitor is coupled between a p-node and an n-node. The p-node is associated with the first node or the second node. The capacitor comprises interleaved p-fingers and n-fingers, a number of the p-fingers being greater than a number of the n-fingers. The switch is coupled between the n-node and the ground node.

Another embodiment of the present invention provides a switched capacitor comprising a capacitor and a switch. The capacitor is coupled between a p-node and an n-node and comprises interleaved p-fingers and n-fingers, a number of the p-fingers being greater than a number of the n-fingers. The switch is coupled between the n-node and ground.

A further embodiment of the present invention provides a system comprising a device, an inductor, and a switched capacitor array. The device and the inductor are coupled between first and second nodes. The switched capacitor array is coupled to the first and second nodes and a ground node. Each switched capacitor in the switched capacitor array comprises a capacitor and a switch. The capacitor is coupled between a p-node and an n-node. The p-node is associated with the first node or the second node. The capacitor comprises first through mth metal layers, m being a positive integer greater than 1. Each of the first through the mth metal layers comprises interleaved p-fingers and n-fingers, a number of the p-fingers being greater than a number of the n-fingers on each of the first through mth metal layers. The switch is coupled between the n-node and the ground node.

A still further embodiment of the present invention provides a capacitor comprising first through mth metal layers, m being a positive integer greater than 1. Each of the first through the mth metal layers comprises interleaved p-fingers and n-fingers. A number of the p-fingers is greater than a number of the n-fingers on each of the first through mth metal layers.

A yet another embodiment of the present invention provides a method comprising the following steps. Interleaving p-fingers and n-fingers on a first metal layer, a number of the p-fingers being greater than a number of the n-fingers. Interleaving p-fingers and n-fingers on m additional metal layers, m being a positive integer greater than 1, a number of the p-fingers being greater than a number of n-fingers for each of the m additional metal layers. Coupling the first metal layer and the m additional metal layers together to produce a capacitor. Optionally, switchably coupling the n-fingers to a ground node.

A yet further embodiment of the present invention provides a method comprising the following steps. Coupling an inductor and a device between first and second nodes. Coupling a switched capacitor array to the first and second nodes and to a ground node. Each capacitor of the switched capacitor array is produced thorough: (a) interleaving p-fingers and n-fingers on a first metal layer, a number of the p-fingers being greater than a number of the n-fingers, (b) interleaving p-fingers and n-fingers on m additional metal layers, m being a positive integer greater than 1, a number of the p-fingers being greater than a number of n-fingers for each of the m additional metal layers, and (c) coupling the first metal layer and the m additional metal layers together to produce the capacitor. Coupling the capacitor between the first or the second node and a third node. Coupling a switch between the third node and the ground node.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The present invention is directed to a switched capacitor array having reduced parasitics. This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

A switched capacitor array can be used in a frequency tuning circuit. The switched capacitor array can be used in narrow bandwidth or wide bandwidth systems. For a narrow bandwidth system, the switched capacitor array can be used to switch in and out unit capacitors to fine tune a capacitance value of the unit capacitor to compensate for frequency variations in view of process and temperature variations. For a wide bandwidth system, the switched capacitor array can be used to switch in and out unit capacitors to produce a large capacitance difference, which can provide a desired wide tuning range.

The switched capacitor array can be coupled to various devices for multiple frequency bands, such as in wireless LAN (IEEE 802.11a/b/g) and cellular phones (GSM/EDGE/WCDMA). Example frequency and bandwidth-tuned devices within a circuit can include, but are not limited to, a low noise amplifier, a crystal oscillator, a voltage controlled oscillator, a power amplifier, or the like. For example, the switched capacitor array can be coupled to an output of these devices within a circuit to change their bandwidth or alter their frequency.

In one example, a capacitor used in each unit cell of a switched capacitor array can be a finger metal capacitor (or strip metal capacitor, where fingers and strips are used interchangeably throughout). The finger metal capacitor can be used as a unit capacitor in the unit cell for its linearity, which is good for phase noise and to substantially eliminate harmonic distortion, and for its small value, so that a fine frequency resolution can be achieved. The finger metal capacitor can be referred to as an interdigital capacitor. The unit cell, and any interaction of parasitics from adjacent unit cells, is not usually a factor considered during manufacture of these capacitors. Rather, general circuit or system level compensation schemes are implemented to account for the parasitics. However, the parasitics can have a large impact on tuning range if compensation for the parasitics is not fully accounted for during a design process. For example, although a single capacitor and associated parasitics may not affect tuning range to any real degree, when more and more branches are used in the array, the cumulative effect of all the parasitic capacitances can degrade the tuning range by 10% or more. Thus, a larger unit capacitor size may need to be used to compensate for the 10% degradation, which can result in a non-optimal amount of real estate of a circuit being occupied by the required larger capacitor.

Thus, what is needed is an arrangement for a capacitor in a switched capacitor array that can be used to minimize parasitic capacitance caused by each unit cell and adjacent unit cells without the need for system or circuit level compensation schemes. In one example, by reducing parasitic capacitance, the capacitor arrangement can substantially eliminate tuning range degradation when used in a switch capacitor array.

Figure 1:
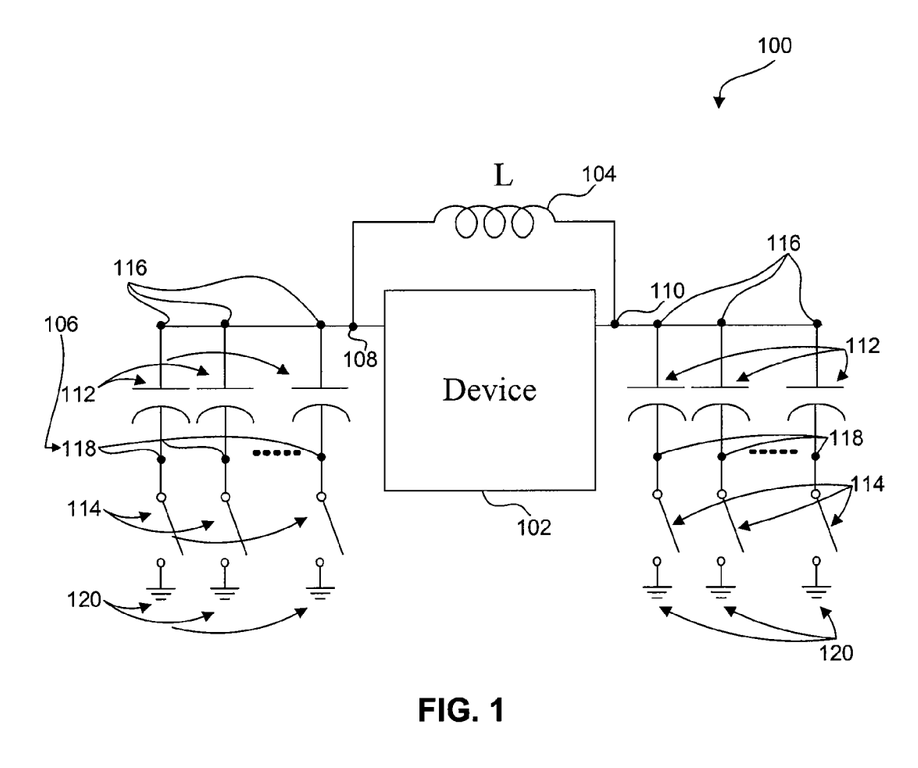
FIG. 1 shows a system, according to an embodiment of the present invention.

FIG. 1 shows a system 100, according to an embodiment of the present invention. For example, system 100 can be part of a frequency tuning circuit with a switched capacitor array. In the example shown, system 100 comprises a device 102, an inductor 104, and a switched capacitor array 106.

In one example, device 102 is coupled between a first node 108 and a second node 110. In various examples, device 102 can be, but is not limited to, a low noise amplifier, a crystal oscillator, a voltage controlled oscillator, a power amplifier, or the like. It is to be appreciated that device 102 can be any device that is frequency or bandwidth tunable using switched capacitor array 106.

In this example, inductor 104 is coupled between first node 108 and second node 110 and across device 102.

In one example, switched capacitor array 106 includes one or more branches each having a capacitor 112 and a switch 114. In the example shown, in each branch capacitor 112 is coupled between a p-node 116 and an n-node 118. The p-node is associated with first node 108 or second node 110. In addition, in each branch switch 114 is coupled between n-node 118 and ground or a ground node 120. In one example, switches 114 can be a transistor, or other similar devices.

In operation, through opening or closing one or more switches 114, a frequency or bandwidth of device 102 is adjusted. In one example, a frequency change of system 100 is derived from Equation 1 shown below and a tuning range of system 100 is derived from Equation 2 shown below.

$$\Delta\omega = \frac{1}{\sqrt{LC}} - \frac{1}{\sqrt{L(C+\Delta C)}} \approx \frac{1}{\sqrt{LC}}\frac{\Delta C}{C} = \frac{\omega \Delta C}{C} \quad \text{Eq. 1}$$

$$\text{tuning range} = \frac{\Delta\omega}{\omega} = \frac{\Delta C}{C} \quad \text{Eq. 2}$$

In Equation 1 and 2, $\omega$ is a frequency range or bandwidth, L is an inductance value of inductor 104, and C is a capacitance of capacitor 112. From Equation 2, a tuning range is proportional to capacitance change $\Delta C$ over nominal capacitance value C.

Figure 2:
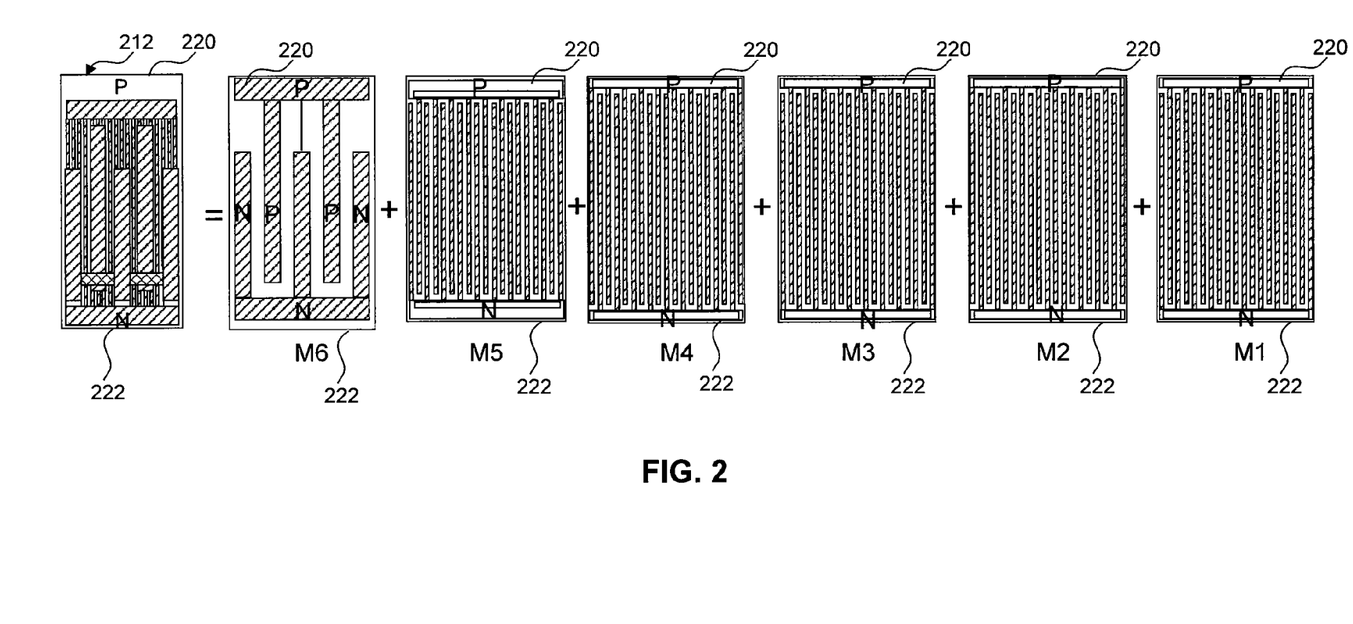
FIG. 2 shows a layout of first through mth metal layers of a capacitor.

FIG. 2 shows a layout of first through mth metal layers M of a capacitor 212. In this example, capacitor 212 can comprise a finger or strip capacitor including multiple stacked levels, e.g., six levels, of different inter-digitized metals, i.e., from M1 to M6. In each layer M, some outer metal strips 220 belong to P, while some outer metal strips 222 belong to N (for ease of viewing only some P and N strips are labeled 220 and 222). In this example, when M1 to M6 are assembled or stacked together, there are more N strips than P strips for each unit cell or unit capacitor. However, having more N strips than P strips can degrade tuning range of an associated tunable device, such as device 102 shown in FIG. 1, as discussed below.

With reference again to FIG. 1, and continued reference to FIG. 2, when formed into an array, whether switch 114 is coupled to p-node 116 or n-node 118 can affect tuning range. For example, in the arrangement shown, P strips 220 are all enclosed by N strips 222 for all metal layers M. When P side 220 of capacitor 212 connects to an output of device 102 and N side 222 of capacitor 212 connects to switch 114 the arrangement can degrade tuning range, as will be discussed in detail below with respect to FIGS. 3 and 4. As discussed above, typically manufacturing processes do not consider whether there are more P strips or N strips in a final unit capacitor. Rather, designers use general compensation schemes so that they do not have to specifically design the unit capacitors.

Figure 3:
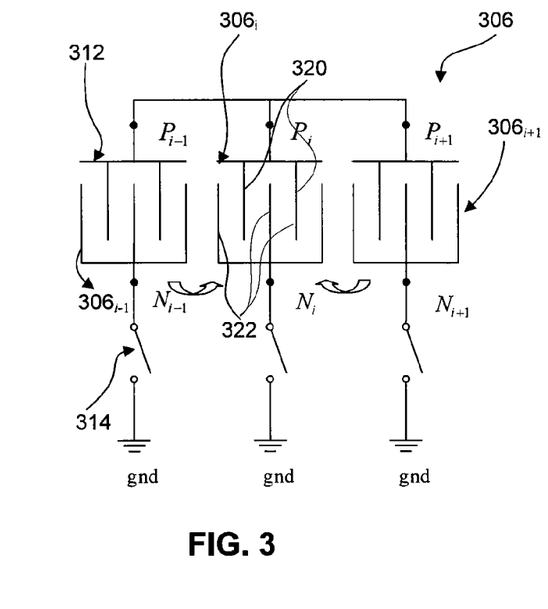
FIG. 3 shows a circuit diagram of a switched capacitor array.

FIG. 3 shows a circuit diagram of a switched capacitor array. For example,

FIG. 3 shows characteristics of a switched capacitor cell 306, which can be a portion of an array of switched capacitor cells 306.

Figure 4:
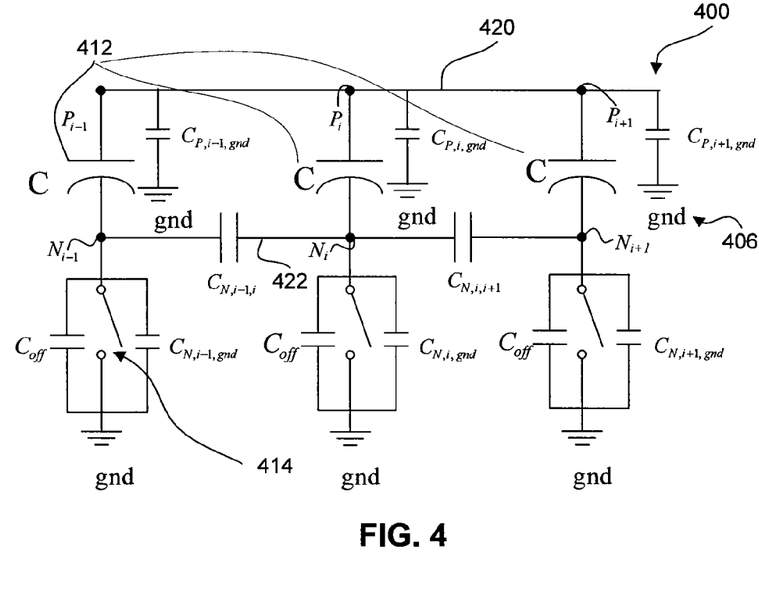
FIG. 4 shows a circuit diagram of a switched capacitor array including parasitics.

FIG. 4 shows a circuit diagram 400 of a switched capacitor array 406 including parasitics. For example, FIG. 4 shows equivalent circuit 400 (including parasitic capacitances) of an array of switched capacitor cells 406, based on switched capacitor cells 306 in FIG. 3. Both FIGS. 3 and 4 are representative circuits of when, as shown in FIG. 2, there are more N strips than P strips in a unit capacitor.

A shown in FIG. 3, a three-branch section of an array is shown, such that each branch includes a capacitor 312 and a switch 314 (e.g., 312/314($i$), 312/314($i$+1), and 312/314($i$−1)). As can be appreciated, more or less branches can be utilized. In this example, each capacitor 312 includes two (2) P strips 320 interleaved between three (3) N strips 322. Thus, in this embodiment, as discussed above with respect to FIG. 2, P strips 320 are enclosed by N strips 322, in other words there are more N strips 322 in each capacitor cell 312 than P strips 320. Further, between unit cells $306_{i-1}$, $306_i$, and $306_{i+i}$, the outermost N strips 322 for adjacent unit cells 306 are adjacent each other. Importantly, the N strips 322 are coupled to switch 314 and therefore are most effected by the parasitic capacitance of switch 314.

Again, FIG. 4 shows a circuit equivalent to FIG. 3 including parasitics associated with the capacitors and the switches. For example, a three-branch section of an array is shown, such that each branch includes a capacitor C 412 and a switch 414 (e.g., 412/414($i$), 412/414($i$+1), and 412/414($i$−1)). As can be appreciated, more or less branches can be utilized. Each capacitor C 412 and switch 414 includes associated parasitic capacitances. For example, each P strip 420 includes a parasitic capacitance $C_{p,i,gnd}$ between each P node and ground. Also, each N strip 422 includes two parasitic capacitances, one parasitic capacitance between N strips, $C_{N,i-1,i}$ and $C_{N,i,i+1}$, and one parasitic capacitance between each N node and ground, $C_{n,i,gnd}$. Finally, each switch 414 includes a parasitic capacitance $C_{off}$ between each N node and Ground.

In one example, assuming:

$$C_{P,i-1,gnd} = C_{P,i,gnd} = C_{P,i+1,gnd}$$

$$C_{N,i-1,gnd} = C_{N,i,gnd} = C_{N,i+1,gnd}$$

Then $C_{eff}$ can be determined based on Equations 3 and 4:

$$C_{eff} = C_{max} = 3(C + C_{p,i,gnd}) \qquad \text{Eq. 3}$$

$$C_{eff} = C_{min} = 3C_{p,i,gnd} + 3(C//(C_{off} + C_{N,i,gnd})) \qquad \text{Eq. 4}$$

Then, according to Equation 2 above, the tuning range for the embodiment shown in FIGS. 3 and 4 would be as shown in Equation 5:

$$\text{tuning range} = \frac{\Delta C}{C} \qquad \text{Eq. 5}$$
$$= \frac{C_{max} - C_{min}}{C}$$
$$= 3\left(\frac{1}{1 + \frac{C_{off} + C_{N,i,gnd}}{C}}\right)$$

From Equation 5, it is clear that $C_{P,i,gnd}$ has a minimal effect on tuning range because the parasitic capacitance is always present, e.g., whether a switch 414 is ON or OFF, such that the effect of this capacitance on tuning range is cancelled out in Equation 5. Rather, it is $C_{N,i,gnd}$ that results in the most effect, i.e., degradation, on tuning range in Equation 5. The larger the parasitic capacitance $C_{N,i,gnd}$, the more tuning range can be degraded.

Also, although the mutual capacitances between N nodes of different cells 406, i.e., $C_{N,i-1,i}$ and $C_{N,i,i+1}$, appear to not effect tuning range in Equation 5, in operation these parasitic capacitances can effect tuning range. For example, there is resistance and inductance along a signal path, and phases and magnitudes of a signal can change at different unit cells 406. In this case, a voltage difference between two sides of these mutual capacitances $C_{N,i-1,i}$ and $C_{N,i,i+1}$ is not zero, which can result in a mutual capacitance, e.g., an equivalent capacitance to ground at N nodes, that can further reduce the tuning range. In addition, as a number of branches in the array increases, and more unit cells 406 are introduced, the effect of mutual capacitance $C_{N,i-1,i}$ and $C_{N,i,i+1}$ can be amplified.

As discussed above, system or circuit based compensation techniques can be used to account for these degradations. For example, an absolute capacitance of the unit cell can be increased. However, an increase in absolute capacitance for each unit cell can result in a greater portion of the circuit being occupied by the larger capacitance, which can be undesirable.

Figure 5:
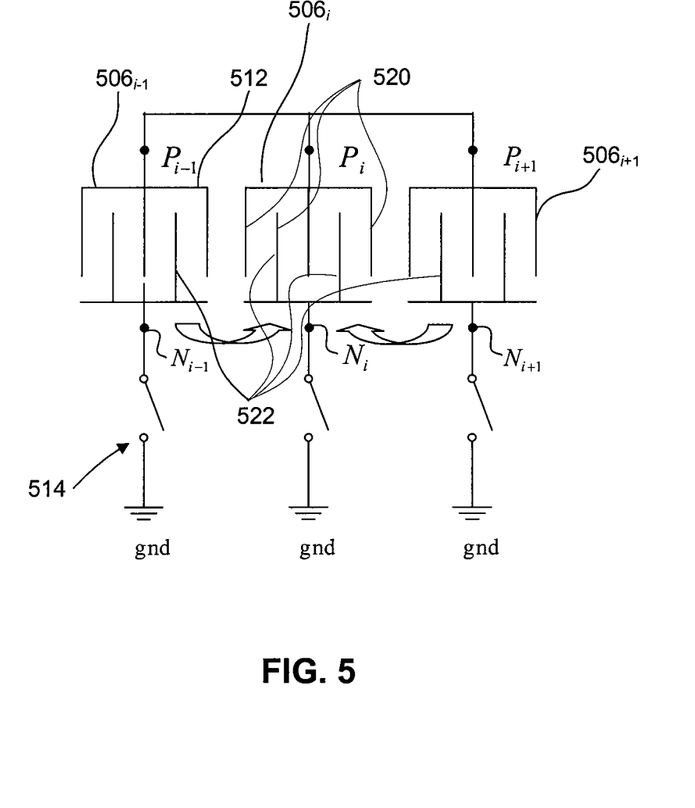
FIG. 5 shows a circuit diagram of a switched capacitor array, according to an embodiment of the present invention.
Figure 6:
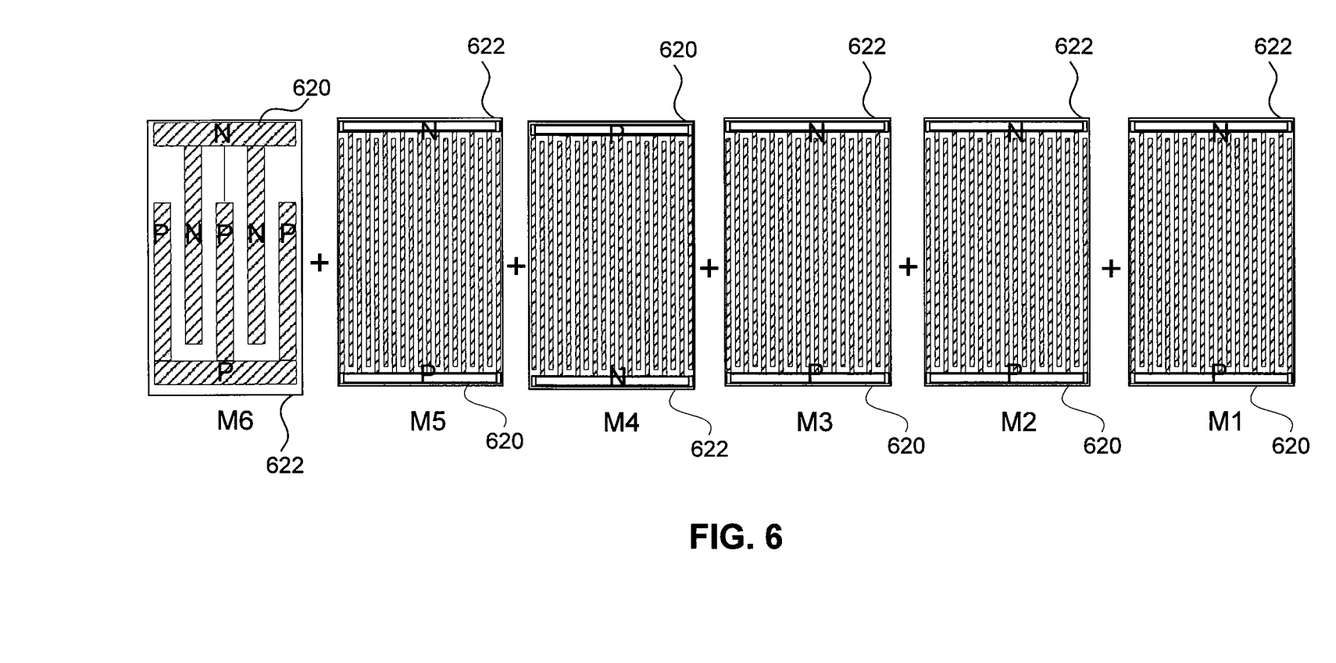
FIG. 6 shows a layout of first through mth metal layers of a capacitor, according to an embodiment of the present invention.

Alternatively to FIGS. 2-4, in another arrangement shown in FIGS. 5-6 N strips (see N strips 522/622 in FIGS. 5 and 6) are all enclosed by P strips (see P strips 520/620 in FIGS. 5 and 6). In the arrangement of FIGS. 5 and 6, parasitic capacitance appears at an output of a circuit, instead of internal nodes at a switch as shown in FIG. 2-4. In this alternative arrangement shown in FIGS. 5-6, the tuning range is greatly improved compared to the arrangement shown in FIGS. 2-4, as discussed in detail below. Further, this improvement can be accomplished without requiring compensation techniques, such as requiring additional capacitor real estate on the circuit.

FIG. 5 shows a circuit diagram of a capacitor array, according to an embodiment of the present invention. In this example, similar to FIG. 3, a three-branch section of an array is shown, such that each branch includes a capacitor 512 and a switch 514 (e.g., 512/514($i$), 512/514($i$+1), and 512/514($i$−1)). As can be appreciated, more or less branches can be utilized in the array. A difference between the embodiment in FIG. 5 and the embodiment shown in FIG. 3 is that the unit capacitor is "inverted," i.e., each capacitor 512 includes three (3) P strips 520 interleaved around two (2) N strips 522. Thus, in this embodiment, as discussed above, N strips 522 are enclosed by P strips 520, in other words there are more P strips 520 in each capacitor unit cell 512 than N strips 522. Further, between unit cells 506, the N strips 522 are no longer adjacent each other, but rather spaced a distance apart, as the outermost P strips 520 are adjacent to one another in adjacent cells. Both of these changes in the arrangement of FIG. 5 substantially reduce parasitics, which reduces degradation of tuning range and bandwidth, based on the effective tuning range shown in Equation 5.

In this example, comparing FIG. 5 with FIG. 3, the "inverted" layout scheme of FIG. 5 can reduce the capacitance of $C_{N,i,gnd}$, which increases tuning range according to Equation 5. Also, in this example, a capacitance of $C_{N,i-1,i}$ and $C_{N,i,i+1}$ is also reduced by enlarging a distance between N nodes within and between different unit cells 506, which further improves the tuning range. For example, in the example shown in FIG. 5, capacitance values for $C_{N,i,i+1}$ and $C_{N,i-1,i}$ can be reduced by half compared to the capacitance values in the embodiment of FIG. 3, the reduction of which increases tuning range. In addition, as can be understood, the more branches in the array, the greater the increase in tuning range as compared to the arrangement in FIG. 3. In one example, combining the benefits of reduced capacitance for $C_{N,i,gnd}$, $C_{N,i-1,i}$ and $C_{N,i,i+1}$, the tuning range can be improved more than 10% without any additional circuit or system level compensation needed. This can be very beneficial for a crystal oscillator or a voltage controlled oscillator being used in a wireless application.

FIG. 6 shows a layout of first through mth metal layers M of a capacitor, according to an embodiment of the present invention. In this example, similar to FIG. 2, the capacitor can comprises a finger or strip capacitor including multiple stacked levels, e.g., six levels, of different inter-digitized metals, i.e., from M1 to M6. However, in contrast to capacitor 212 in FIG. 2, in a final arrangement the capacitor includes more P strips 620 than N strips 622. Thus, this arrangement produces the same benefits as described above for FIG. 5.

In one example, to ensure the final arrangement of capacitor 512 has more P strips 520/620 than N strips 522/622, the manufacturing process can include safeguards and specific design procedures to ensure that within each M metal layer and/or overall P strips 520/620 are more in number than the N strips 522/622. In another example, N strips 522/622 can be manually removed from one or more M layers or levels to ensure that within each M metal layer and/or overall P strips 520/620 are more in number than the N strips 522/622. It is too be appreciated that other methods or processes can be implemented to ensure capacitor 512 include more P strips 520/620 than N strips 522/622 to gain the advantages discussed above.

Figure 7:
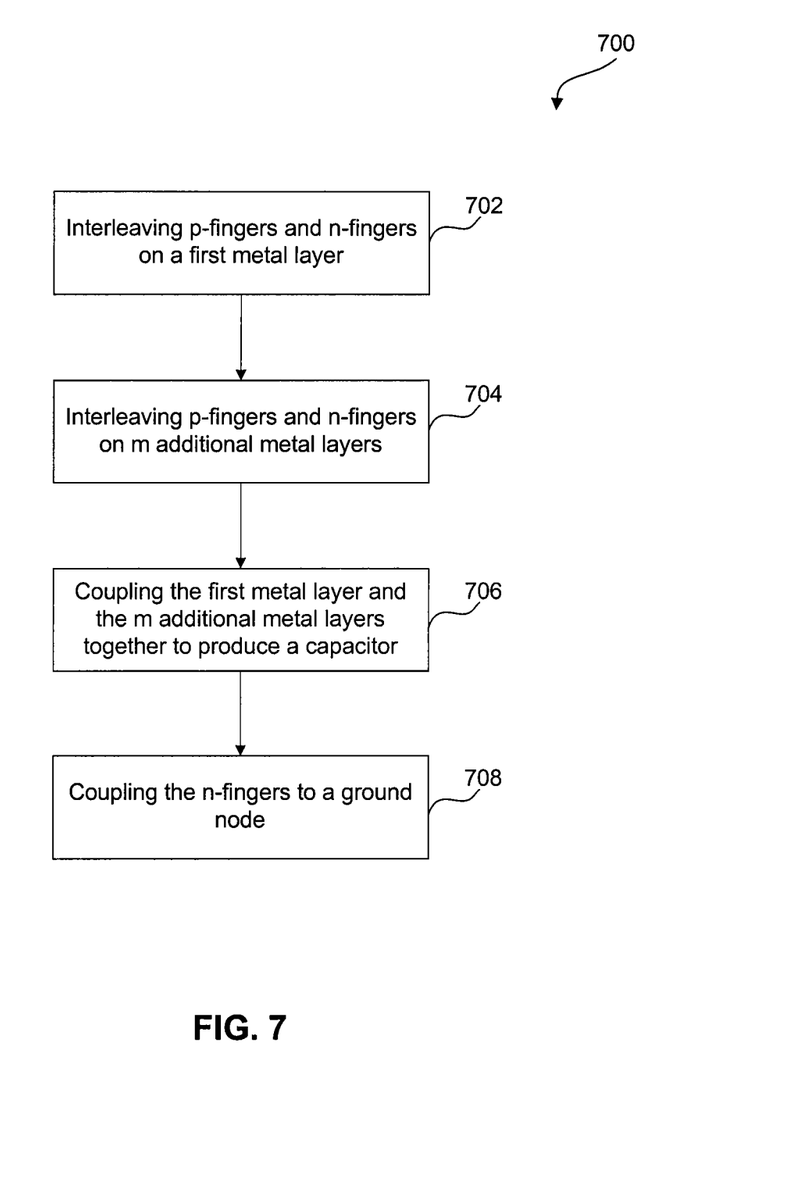
FIG. 7 is a flow chart depicting a method of forming a capacitor, according to an embodiment of the present invention.

FIG. 7 is a flow chart depicting a method 700, according to an embodiment of the present invention. At step 702, p-fingers and n-fingers are interleaved on a first metal layer. In one example, a number of the p-fingers is greater than a number of the n-fingers. At step 704, p-fingers and n-fingers are interleaved on m additional metal layers, m being a positive integer greater than 1. In one example, a number of the p-fingers is greater than a number of n-fingers for each of the m additional metal layers. At step 706, the first metal layer and the m additional metal layers are coupled together to produce a capacitor. At step 708, the n-fingers are switchably connected to a ground node.

Figure 8:
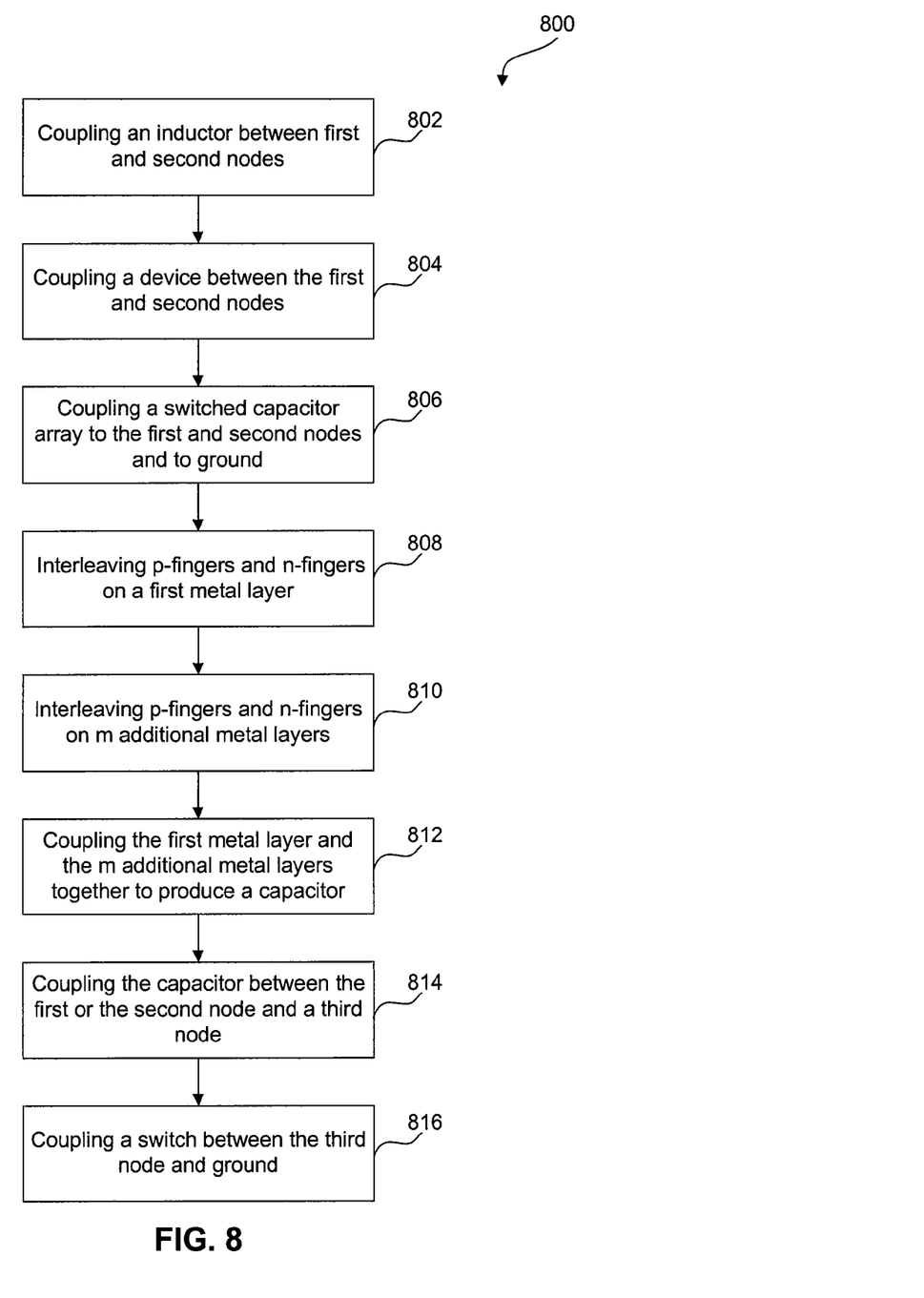
FIG. 8 is a flow chart depicting a method of forming a switched capacitor, according to an embodiment of the present invention.

FIG. 8 is a flow chart depicting a method 800, according to an embodiment of the present invention.

At step 802, an inductor is coupled between first and second nodes. In step 804, a device is coupled between the first node and the second node. At step 806, a switched capacitor array is coupled to the first and the second nodes and to ground.

In one example, each switched capacitor of the switched capacitor array is produced thorough a process of steps 808-816.

In one example, a capacitor is produced through a process of steps 808-812. In step 808, p-fingers and n-fingers are interleaved on a first metal layer. In one example, a number of the p-fingers is greater than a number of the n-fingers. In step 810, p-fingers and n-fingers are interleaved on m additional metal layers, m being a positive integer greater than 1. In one example, a number of the p-fingers is greater than a number of n-fingers for each of the m additional metal layers. In step 812, the first metal layer and the m additional metal layers are coupled together to produce the capacitor.

In step 814, the capacitor is coupled between the first node or the second node and a third node.

In step 816, a switch is coupled between the third node and the ground.

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system, comprising:
a device coupled between first and second nodes; and
a switched capacitor array including adjacent switched capacitors coupled between the first node and a ground node, and between the second node and the ground node, each of the switched capacitors in the switched capacitor array comprising:
a capacitor coupled between a p-node and an n-node, the p-node being associated with the first node or the second node, the capacitor including interleaved p-fingers and n-fingers, a number of the p-fingers being greater than a number of the n-fingers; and
a switch coupled between the n-node and the ground node, wherein the switched capacitor array is configured to substantially reduce parasitic capacitance between the n-node and the ground node and between adjacent n-nodes.

2. The system of claim 1, wherein the device is configured to be a frequency or bandwidth tuned device that is frequency or bandwidth tuned using the switched capacitor array.

3. The system of claim 1, wherein the device comprises:
an amplifier.

4. The system of claim 3, wherein the amplifier comprises:
a low noise amplifier (LNA).

5. The system of claim 1, wherein the switched capacitor array is configured to provide the device with a substantially undegraded tuning range over multiple frequency bands.

6. The system of claim 1, wherein the device comprises:
an oscillator.

7. The system of claim 1, further comprising:
an inductor coupled between the first and second nodes.

8. The system of claim 1, wherein an open or a closed state of each switch in the switched capacitor array configures a tuning range of the switched capacitor array.

9. A system, comprising:
a device coupled between first and second nodes; and
a switched capacitor array including adjacent switched capacitors coupled between the first node and a ground node, and between the second node and the ground node, each of the switched capacitors in the switched capacitor array comprising:
  a capacitor coupled between a p-node and an n-node, the p-node being associated with the first node or the second node, the capacitor including a plurality of metal layers, a layer from among the plurality of metal layers comprising interleaved p-fingers and n-fingers, a number of the p-fingers being greater than a number of the n-fingers on the layer; and
  a switch coupled between the n-node and the ground node,
wherein the switched capacitor array is configured to substantially reduce parasitic capacitance between the n-node and the ground node and between adjacent n-nodes.

10. The system of claim 9, wherein the device is configured to be a frequency or bandwidth tuned device that is frequency or bandwidth tuned using the switched capacitor array.

11. The system of claim 9, wherein the device comprises: an amplifier.

12. The system of claim 9, wherein the switched capacitor array is configured to provide the device with a substantially undegraded tuning range over multiple frequency bands.

13. The capacitor of claim 9, wherein outermost fingers of the interleaved p-fingers and n-fingers are p-fingers.

14. The system of claim 9, wherein the device comprises: an oscillator.

15. The system of claim 9, further comprising:
an inductor coupled between the first and second nodes.

16. The system of claim 9, wherein an open or a closed state of each switch in the switched capacitor array configures a tuning range of the switched capacitor array.

17. A method, comprising:
coupling a device between first and second nodes;
coupling adjacent switched capacitors within a switched capacitor array to the first node and to a ground node;
coupling the adjacent switched capacitors to the second node and to the ground node, wherein each of the switched capacitors in the switched capacitor array is produced by:
  interleaving p-fingers and n-fingers on a plurality of metal layers, a metal layer from among the plurality of metal layers having the p-fingers associated with the first node or the second node, a number of the p-fingers being greater than a number of the n-fingers;
coupling the plurality of metal layers together to produce a capacitor;
  coupling the capacitor between the first node or the second node and a third node; and
  coupling a switch between the third node and the ground node to provide the switched capacitor and to substantially reduce parasitic capacitance between:
    the third node of the switched capacitor and the ground node, and
    third nodes of capacitors adjacent to the switched capacitor.

18. The method of claim 17, further comprising:
frequency or bandwidth tuning the device using the switched capacitor array.

19. The method of claim 17, wherein the coupling the device comprises:
coupling an amplifier as the device.

20. The method of claim 17, further comprising:
providing a substantially undegraded tuning range for the device over multiple frequency bands.

21. The method of claim 17, wherein the coupling a device further comprises:
coupling an oscillator as the device.

22. The method of claim 17, further comprising:
coupling an inductor coupled between the first and second nodes.

23. The method of claim 17, further comprising:
configuring a tuning range of the switched capacitor array by an open or a closed state of each switch in the switched capacitor array.

* * * * *

UNITED STATES PATENT AND TRADEMARK OFFICE
CERTIFICATE OF CORRECTION

| | |
|---|---|
| PATENT NO. | : 8,421,556 B2 |
| APPLICATION NO. | : 12/580916 |
| DATED | : April 16, 2013 |
| INVENTOR(S) | : Chen et al. |

It is certified that error appears in the above-identified patent and that said Letters Patent is hereby corrected as shown below:

In the Claims

Column 10, Line 33, please replace "a device" with --the device--

Signed and Sealed this
Twenty-ninth Day of October, 2013

Teresa Stanek Rea
*Deputy Director of the United States Patent and Trademark Office*